United States Patent [19]

Barndt et al.

[11] Patent Number: 4,460,617

[45] Date of Patent: Jul. 17, 1984

[54] PROTEIN-FREE COFFEE WHITENER AND METHOD OF MAKING SAME

[75] Inventors: Richard L. Barndt, Highland Park; Gary A. Zwiercan, Califon; Paolo C. Trubiano, Somerville, all of N.J.

[73] Assignee: National Starch and Chemical Corp., Bridgewater, N.J.

[21] Appl. No.: 385,001

[22] Filed: Jun. 4, 1982

[51] Int. Cl.³ .............................................. A23C 11/00
[52] U.S. Cl. ...................................... 426/609; 426/98; 426/661; 426/471
[58] Field of Search ................. 426/98, 103, 603, 609, 426/601, 661, 471

[56] References Cited

U.S. PATENT DOCUMENTS

| | | | |
|---|---|---|---|
| 3,091,567 | 5/1963 | Wurzburg et al. | 426/98 X |
| 3,455,838 | 7/1969 | Marotta et al. | 252/316 |
| 3,582,362 | 6/1971 | Drews et al. | 426/613 |
| 3,971,852 | 7/1976 | Brenner et al. | 426/103 |
| 4,045,589 | 8/1977 | Petrowski et al. | 426/98 X |
| 4,242,364 | 12/1980 | Buddemeyer et al. | 426/98 |
| 4,331,689 | 5/1982 | Shemwell | 426/98 |
| 4,415,600 | 11/1983 | Miller et al. | 426/613 |

*Primary Examiner*—Robert A. Yoncoskie
*Attorney, Agent, or Firm*—James & Franklin

[57] ABSTRACT

A dry, protein-free coffee whitener comprises a dried emulsion concentrate comprising an edible fat having an average particle size of about 1-3 microns in diameter. The fat is stabilized with a degraded and chemically modified starch derivative having a flow viscosity of at least 15 seconds and a lipophilic character in an amount sufficient to provide said concentrate with a starch derivative to fat ratio in the range of 0.05-0.3 to 1. A method of preparing the stable, dry, protein-free coffee whitener comprises forming a liquid emulsion concentrate comprising water and the stabilized edible fat and drying the liquid emulsion concentrate.

20 Claims, No Drawings

PROTEIN-FREE COFFEE WHITENER AND METHOD OF MAKING SAME

BACKGROUND OF THE INVENTION

This invention relates to a dried non-dairy fat emulsion product suitable for use as a coffee whitener and to the method of producing the product. More particularly, the invention relates to a protein-free dried fat emulsion product, which, when reconstituted with an aqueous media, such as coffee, provides a stable oil-in-water emulsion food product.

In recent years, dried, non-dairy coffee whiteners have become of increasing importance in the food industry because of their ability to whiten coffee and their economy, taste, ease of handling and excellent shelf-life. Such dry, non-dairy coffee whiteners are prepared as an emulsion concentrate which is spray dried and, on addition to an aqueous media such as coffee or tea, forms a reconstituted oil-in-water emulsion which whitens and flavors the beverage. Generally, such powdered whiteners comprise, on a dry weight basis, 25%-50% vegetable fat, 35%-65% carbohydrate (such as corn syrup solids, sucrose, etc.), 3%-12% protein, 1%-5% emulsifiers, 0.55-3% stabilizer and stabilizing salts, plus minor amounts of coloring and flavoring agents and anti-caking agents.

In such dry coffee whitener formulations, the vegetable fat or oil, which has a particle size of about 1-3 microns in diameter, provides whitening power, body and viscosity. The whitening effect is produced in coffee or tea primarily as a result of light reflected from the surface of finely emulsified fat globules. The carbohydrate acts as a carrier for the fat to retard coalescense of the fat and provides some sweetness effect. Emulsifiers, such as mono- and diglycerides, diacetyl tartaric acid esters of mono- and diglycerides, propylene glycol-monostearate, lecithin, and the like are incorporated to maintain the fat globules in dispersion. However, it has been found that while such conventional emulsifiers are effective in stabilizing the liquid emulsion concentrate prior to the drying step, they are ineffective following drying procedures. Thus, in the production of a coffee whitener, a stable liquid emulsion concentrate containing fat or oil, water and conventional emulsifier can not be dried and reconstituted in coffee to form the same stable emulsion, for upon reconstitution a breakdown of the emulsion occurs as evidenced by separation of the fat and coalescense of the fat globules, with little or no whitening of the coffee.

This problem has been overcome heretofore by including in the liquid emulsion concentrate, a water dispersible protein, such as sodium caseinate or soy protein. The inclusion of protein in the liquid emulsion concentrate has been found to be necessary to stabilize the emulsion through the drying step, so that when the dried product is reconstituted in coffee, a stable emulsion is provided.

While this use of protein in the formulation has enabled dried coffee whiteners to be prepared having excellent stability and whitening, it is disadvantageous in some respects. In formulations which contain protein, it is also common to include in the products, stabilizers, such as carrageenin, alginates, guar gum, etc., and/or stabilizing salts, such as sodium citrate, tetrasodium pyrophosphate, etc. to improve the colloidal dispersibility of the protein. The inclusion of these materials, of course, increases the cost of the dried product. Moreover, while sodium caseinate is legally defined to be a non-dairy material, its inclusion in the emulsion makes the product unacceptable to some ethnic groups. The use of other water dispersible proteins, such as soy protein, has been less than satisfactory due to off-flavors, feathering of the protein in coffee and other problems.

U.S. Pat. No. 4,045,589 discloses that a dried fat emulsion product having excellent stability and coffee whitening characteristics can be prepared without the use of protein by incorporating in the formulation a chemically modified dextrinized starch having a lipophilic character. Such chemically modified starches are effective in maintaining a stable emulsion subsequent to drying of the liquid emulsion concentrate so that protein may be eliminated from the formulation. Thus, a liquid emulsion concentrate containing water, vegetable fat or oil, carbohydrate, emulsifier and the chemically modified dextrinized starch having a lipophilic character is prepared and dried to provide a product which, upon reconstitution by addition to an aqueous media such as coffee or tea, disperses easily in hot liquids with little sign of fat "oiling off" or emulsion instability and which has a whitening effect in coffee equal or superior to conventional whiteners. The pH of this liquid emulsion concentrate must be maintained at about 4.0 or below prior to drying, in order for the chemically modified dextrinized starch to effectively stabilize the emulsion through the drying step. One or more buffering salts are added to the dried emulsion concentrate to improve the flavor of the product as a coffee whitener. The starch derivative to fat ratio in the concentrate must be at least 0.4 to 1, and is preferably at least 0.6, for the dextrinized chemically modified starch to effectively stabilize the emulsion through the drying step.

The protein-free whitener has not, however, proved to be entirely satisfactory. The high starch derivative to fat ratio required by the patented formulation in order to prepare a stable dried emulsion entails a large consumption of the starch derivative which is not only costly, but adversely affects the flavor of the whitener. Furthermore, as the pH of the liquid emulsion concentrate must be maintained at or below 4.0 prior to drying, buffering salts must be added to the whitener in order to provide the product with a higher pH upon reconstitution, as is necessary if it is desired to reduce the acidity of the coffee and thereby improve its taste. In other words, one must lower the pH of the concentrate and then raise the pH of the overall whitener, thereby increasing the cost and complexity of manufacturing the whitener. Also, the patented formulation requires the use of emulsifiers which affects the flavor of the whitener.

From the point of view of the consumer, the product has not been entirely satisfactory because there remains some appreciable level of "oiling off" and the taste of the whitener is not entirely acceptable.

Accordingly, it is an object of the present invention to provide a dry, protein-free coffee whitener which requires only a relatively low starch derivative to fat ratio.

It is also an object to provide such a whitener which exhibits relatively less "oiling-off", if any, and has an improved taste.

A further object is to provide such a whitener which, in preferred embodiments, does not require acidulation of the emulsion prior to drying, and moreover does not require the use of an emulsifier.

SUMMARY OF THE INVENTION

It has now been found that a dried coffee whitener can be prepared using a starch derivative having a high flow viscosity, the starch derivative enabling the use of a relatively low starch derivative to fat ratio. Thus the dry coffee whitener of the present invention comprises a dried emulsion concentrate comprising an edible fat having an average particle size of about 1-3 microns in diameter. The fat is stabilized with a degraded and chemically modified starch derivative having a flow viscosity of at least 15 seconds and a lipophilic character in an amount sufficient to provide the concentrate with a starch derivative to fat ratio in the rate of 0.05-0.3 to 1, the emulsion having a pH below 8.0.

In a preferred embodiment, the concentrate comprises 10-70% (preferably 24-45%) by weight of the edible fat (without stabilizer) and may comprise up to 85% (preferably 40-75%) by weight of a water-soluble carbohydrate. Although it is generally not required, the concentrate may contain up to 3.0% by weight of an emulsifier. The edible fat has an average particle size of about 1-2 microns in diameter, and the starch derivative to fat ratio is in the range of 0.1 to 0.2 to 1. The pH of the emulsion may be adjusted with an acidulant, if necessary, in an amount sufficient to provide the emulsion with the pH below 5.5, yet preferably the pH is at least 4.5.

While it is only critical that the flow viscosity of the starch derivative be at least 15 seconds, it is preferably about 15-150 seconds, typically about 80-125 seconds.

In its preferred embodiment, the whitener is protein-free and may also be emulsifier-free and phosphate-free.

The present invention further encompasses a method of preparing the stable, dry coffee whitener which comprises forming a liquid emulsion concentrate comprising water, and the aforementioned stabilized edible fat, the emulsion having a pH below 8.0, and then drying the liquid emulsion concentrate.

Further aspects of the present invention encompass dry, free-flowing particles containing a water-insoluble substance encapsulated therein, the particles consisting essentially of a solid matrix of an encapsulating agent consisting essentially of a modified starch acid-ester of a substituted dicarboxylic acid, the starch acid-ester being modified to have a flow viscosity of at least 15 seconds in an aqueous dispersion, the matrix having the water-insoluble substance encapsulated therein the form of minute droplets. The invention finally encompasses a method for encapsulating a water-insoluble substance which comprises making an aqueous dispersion of the aforementioned encapsulating agent, emulsifying the water-insoluble substance in this dispersion, and thereafter drying the resulting emulsion to form dry, free-flowing particles comprising the encapsulating agent containing the water-insoluble substance encapsulated therein.

DESCRIPTION OF THE PREFERRED EMBODIMENTS

More specifically, the product of the present invention is a dry, stable, protein-free fat emulsion product, which is provided by forming a liquid emulsion concentrate containing a fat or oil stabilized with a degraded and chemically modified starch derivative having a lipophilic character, and drying the liquid emulsion concentrate.

A wide variety of edible fats or oils may be used in the present invention. The fat or oil may be of animal or vegetable source, but should have a bland or neutral flavor and long term stability towards oxidation and the development of rancidity. Moreover, in formulating dried coffee whiteners it is generally preferred to use fats with a melting point of about 38° C.-46° C. (110° F.-115° F.) so that a major portion of its triglycerides will remain in a solid state at the maximum temperatures usually encountered in handling, shipping and storage of the product. Fats and oils which may be used include partially or fully hydrogenated vegetable fats and oils, such as, for example, cottonseed oil, coconut oil, corn oil, soybean oil, peanut oil, sunflower oil, palm kernel oil, and the like, and mixtures thereof, tallow and lard.

While the dried product concentrate may comprise simply the fat or oil stabilized in the manner described hereinafter, typically other ingredients will be present and the amount of fat or oil in the dried product will vary from about 15 to 70% by weight, with levels of about 25% to 45% being preferred.

While the product of the present invention may be prepared without using any external emulsifier, an emulsifier may be included in the liquid emulsion concentrate to increase the ease of formation of the emulsion and to promote the stability of the liquid emulsion concentrate to be dried. Emulsifiers which may be used are those which are approved for use in foods, such as mono- and diglycerides, distilled monoglycerides, glycerol mono-stearates, sorbitan esters of hexitol anhydrides, polyoxyethylene sorbitan esters of hexitol anhydrides, and combinations of such food approved emulsifiers. The amount of emulsifier used, if any, is up to 3.0% by weight of the solids used in the emulsion concentrate, preferably only up to 2.5%. Amounts greater than about 3.0% have been found to decrease the ability of the dried product to whiten coffee and adversely affect the flavor of the product.

As noted hereinabove, the use of a dextrin has been considered heretofore to be an essential ingredients in protein-free dried coffee whiteners. It has now been discovered that a stable, dry coffee whitener having excellent whitening characteristics when reconstituted in coffee can be prepared without the use of a dextrinized starch by incorporating a degraded and chemically modified starch derivative having a flow viscosity of at least 15 seconds. The inclusion of such a starch derivative in the emulsion concentrate stabilizes the emulsion through the drying step so that, when the dried product is reconstituted in coffee, a stable emulsion is formed which has a whitening effect equal or superior to conventional protein-containing whiteners or dextrinized starch-containing whiteners. Furthermore, the use of the high viscosity starch derivative enables the concentrate to utilize a much lower starch derivative to fat ratio and frees the emulsion from the requirement of a low pH. In addition, whiteners made with the high viscosity starch derivative show no appreciable signs of fat "oiling off" or emulsion instability when added to coffee, counteract coffee's bitter notes, and afford improved taste.

Such chemically modified starches are products of a lipophilic character derived from ungelatinized or gelatinized starch acid-esters of substituted dicarboxylic acids. Such ungelatinized starch acid-esters are prepared by reacting an ungelatinized starch, in an alkaline medium, with a substituted cyclic dicarboxylic acid anhydride, such as substituted succinic and glutaric acid anhydrides, as disclosed in U.S. Pat. Nos. 2,661,349, 3,455,838, and the patents referred to therein. Generally, it is preferred to use as the starch derivative, waxy maize starch chemically modified with octenyl succinic anhydride. However, it will be understood that other starches, such as waxy sorghum, sago, tapioca, potato, corn, sorghum, rice and wheat, and other substituted cyclic dicarboxylic acid anhydrides, such as decenyl succinic acid anhydride, nonenyl succinic acid anhydride, heptyl glutaric acid anhydride, and the like may be used in preparing the starch derivatives.

The chemically modified starch acid-esters are not suitable, as such, for use in the present invention because their high viscosity will not permit drying of the emulsion. Accordingly, the starch acid-ester must be further treated, by any of the well known degradation procedures, such as heat, acid or enzyme treatment, to lower its molecular weight and thus produce a starch derivative characterized by a lower viscosity. On the other hand, degradation of the starch derivative must not be allowed to proceed too far or the starch derivative will become dextrinized and therefore of too low a viscosity for the purpose of the present invention. Accordingly, it is critical that the processing of the starch derivative be terminated in time to enable the degraded and chemically modified starch derivative to have a flow viscosity of at least 15 seconds (compared to a flow viscosity of about 7 for water and about 8 for dextrinized starch derivatives). Flow viscosities of 15-150 seconds are preferable with levels of 80-125 seconds being typical. By way of comparison, the undegraded chemically modified starch derivative simply will not flow so that it is of immeasurably high flow viscosity and without utility in the present invention as it could only produce a gummy slurry (rather than a liquid emulsion) and the product would not be spray dryable. Suitably degraded and chemically modified starch derivatives are available from National Starch nd Chemical Corporation of Bridgewater, N.J.

In order to prepare a stable dried emulsion, the amount of starch derivative in the liquid emulsion concentrate should be sufficient to provide the dried emulsion with a starch derivative to fat ratio in the range of about 0.05-0.3 to 1, with a ratio of between 0.1-0.2 to 1 being preferred. Greater amounts may be used without adversely affecting the stability of the dried emulsion, but are generally not desired because of economic considerations.

The pH of the fat-stabilizer containing liquid emulsion concentrate must be maintained at a value below about 8.0 prior to the drying step in order for the starch derivative to stabilize the liquid emulsion concentrate through drying, and is preferably maintained below 5.5. The pH should, however, be maintained at or above 4.5 to minimize the need for buffering salts, as explained hereinbelow. The acceptable maximum pH will vary within the particular degraded and chemically modified starch derivative employed and, if necessary, an acidulant may be added to the emulsion in an amount sufficient to provide the emulsion with a pH below 5.5.

The dried fat emulsion product may also contain a water-soluble carbohydrate such as corn syrup solids, sucrose, lactose, and the like to provide flavor, improve product body and to act as a carrier for the fat. Generally the dried emulsion of this invention contains up to 85% by weight of the carbohydrate, and preferably about 40-75%. While greater amounts may be used, there is no advantage to doing so. However, this is to be understood that the carbohydrate is not an essential ingredient of the dried emulsion and may be entirely eliminated from the product without affecting the stability of the product.

A dried fat emulsion product, to be suitable for use as a coffee whitener should, upon addition to coffee, not only whiten the coffee but also reduce somewhat the bitter notes or acidity of the coffee, which has a pH of about 4.0-4.2, preferably raising the pH of the coffee to between about 4.5 and 5.0, so that some of the coffee bitterness can be removed. As some of the degraded and chemically modified starch derivatives of the present invention require a pH below about 5.5 in order to stabilize the liquid emulsion concentrate during drying, and especially as some require a pH just slightly above 4.5, such particular dried emulsion products may be unable to raise the pH of the coffee sufficiently to remove the coffee bitterness. In such instances, in order to obtain a dried whitener which provides a stable emulsion upon reconstitution in the coffee and which at the same time is capable of reducing the acidity of the coffee, one or more buffering salts may be mixed with the dried emulsion product. The buffering salt is typically dry blended with the dried emulsion in an amount sufficient to provide a product having a pH of between about 5.5 to 7.5 when reconstituted in water. Such a product when added to coffee reduces the acidity of the coffee as seen by an increase in the pH of the coffee to between about 4.5 and 5.0, thereby improving the taste of the coffee. Generally it is preferred to use dipotassium phosphate as the buffering salt to be admixed with the dried fat emulsion product. However other phosphate and citrate salts, such as sodium citrate, tetrasodium pyrophosphate, disodium salts of phosphoric acid, and other food approved buffering salts capable of raising the pH of the dried emulsion may be used. According to a preferred buffered embodiment, dipotassium phosphate salt is dry blended with the dried emulsion concentrate in amounts of from 1% to 3%, preferable 2.0% to 2.5%, by weight of the dried emulsion. As the degraded starches used in the present invention are less sensitive to pH than dextrins, the buffering salts may also be added to the concentrate during spray drying. For example, the buffering salts may be solubilized in a small portion of the water taken out of the pre-emulsion and then added to the emulsion as the emulsion is being spray dried. Preferably two separate spray nozzles are employed, one for the emulsion and one for the buffering salt solution, but where two separate spray nozzles are not available the buffering salt solution may be added to the same feed hose as the emulsion.

A dried fat emulsion product of the present invention, however, even one containing only the stabilized fat, may be able to reduce the acidity of the coffee without the use of buffering salts since such a dried product may have a pH up to about 5.5. The low starch derivative to fat ratio used in the present invention naturally gives rise to a less acidic emulsion due to the low levels of the starch acid-ester while the relative insensitivity of the degraded and chemically modified starch derivative to high pH enables the less acidic emulsion to be employed.

In addition, an anticaking agent, such as sodium silico aluminate, may be added to the dried concentrate to improve the flowability of the dried emulsion. Small amounts of coloring and/or flavoring agents may also be included in the formulation.

To prepare the starch acid-ester, the starch is slurred in water, the pH is adjusted to 7.8 with alkali, and the substituted dicarboxylic acid anhydride (for example, octenyl succinic anhydride) is slowly added while the pH is maintained at 7.8 with alkali. The reaction is complete when no further addition of alkali is necessary, and the starch acid-ester is then recovered by filtration and washed.

The starch acid-ester is then degraded by one of the many well known degradation procedures, such as treatment with heat, enzyme or acid. In the heat treatment, the chemically modified starch derivative is heat treated at a low pH and low moisture, in a manner well recognized by those skilled in the art, until the desired viscosity is reached. In the enzyme treatment, the chemically modified starch derivative is slurred in water, and the pH is adjusted to about 5.6–5.7 with alkali or acid. A small amount of alpha-amylase enzyme (e.g., about 0.02% of the starch) is added to the slurry, which is then heated above the gelatinization point of the starch. When the desired viscosity is reached, the pH is adjusted with acid (e.g., to about 2.0) to deactivate the enzyme and held at that pH for a period of at least 10 minutes. Thereafter the pH may be readjusted. In the acid treatment, prior to undergoing chemical modification, the unmodified starch is hydrolyzed in the presence of acid at a temperature below the gelatinization point of the starch to reduce the molecular weight. The starch is slurred in water, and the acid is then added. The reaction takes place over a sixteen hour period, after which the acid is neutralized with alkali (e.g., to a pH of 5.5), and the starch recovered by filtration. It will be appreciated that, while the enzyme and heat treatments may be performed on either the chemically modified starch derivative (i.e., the starch acid-ester) or the starch prior to chemical modification (i.e., prior to reaction of the starch and acid anhydride), in the acid treatment it is preferable that the degradation precede the chemical modification to prevent possible removal of the chemical groups added during the modification.

In preparing the whitener of this invention, a liquid emulsion concentrate is formed prior to the drying step by dissolving and/or dispersing the various dry ingredients in enough water to maintain the solid in solution or dispersion and provide sufficient fluidity to the concentrate so that it may be pumped and spray dried. The dissolved and dispersed solids of the liquid emulsion concentrate are usually in the range of 50%–70%. Generally, in preparing the emulsion concentrate, the fat is heated to about 54° C.–60° C. (130° F.–140° F.) and the emulsifier (if used) is added to the liquified fat. The chemically modified starch derivative is added, with agitation, to water having a temperature of about 73° C.–93° C. (165° F.–200° F.) to disperse or dissolve it. Adequate time is permitted for complete hydration of the starch. The acidulant (if used) and the carbohydrate (if used) are then added to the water phase, with agitation to dissolve or disperse them. The water phase and fat phase are then mixed and homogenized typically at 50° C. and 3,000 PSI to provide a stable emulsion in which the fat particles average about 1–2 microns in diameter. This liquid emulsion concentrate is then dried to a moisture content not in excess of about 3%. While the liquid emulsion concentrate preferably is spray dried, other drying procedures may also be used, such as freeze drying, drying on heated drums, etc. Dry buffering salts may be added to the emulsion or dry blended with the dried emulsion to provide a stable dried emulsion having a pH of between 6.0–7.0 when reconstituted in water.

The resulting product, when added to coffee, whitens and flavors the coffee with no sign of fat "oiling off" or emulsion instability.

A preferred formulation for the emulsion is as follows:

| INGREDIENT | % |
| --- | --- |
| Water | 50.00 |
| Corn syrup solids | 29.93 |
| Vegetable fat | 17.50 |
| Modified food starch (Starch C, table) | 2.50 |
| Flavoring | 0.07 |
| Coloring (as needed) | — |
| | 100% |

"Flow viscosity", as used herein, is determined by taring a stainless steel Stormer Cup and thermometer and then placing into the cup 30.0 grams (on anhydrous basis). To provide a sample at 15% solids, distilled water is added to the cup to bring the total weight to 200 grams. The sample is mixed long enough to dissolve any lumps, and the sample solution is heated or cooled, as necessary to 22° C. (72° F.). Then 100 milliliters of the sample solution are run through a BF funnel with a calibrated orifice at 22° C. (72° F.). Flow viscosity is the time (in seconds) required for the 100 milliliters of solution to run through the orifice of the glass funnel. The greater the time required, the higher the viscosity.

"Reflectance" is measured by dispersing the whitener in coffee and placing a specimen of the whitened coffee in a Petri dish disposed over the light source of an S-4 Brightness Tester and Colorimeter (manufactured by Diano Corp. of Woburn, Mass.) calibrated to 79.0 using block SS-122. The instrument gives a reading in percentage reflectance. Reflectance measures the amount of light reflected from the bottom of the coffee sample containing the whitener, and is a measure of the whitening power of the whitener. A sample of coffee with no whitener reads about 0.1%; poorly whitened coffee samples gives readings below about 4% and well whitened coffee samples gives readings of 4% or higher.

The following example is given to illustrate the efficacy of the invention. All parts and percentages are by weight unless otherwise indicated.

EXAMPLE

To illustrate the efficacy of the present invention at low and very low starch derivative to fat ratios, six whiteners were prepared, half of them using a very low ratio of about 0.14 to 1 (specimens A-C) and half using a low ratio of about 0.3 to 1 (specimens D-F). All starch derivatives were degraded or dextrinized starch acid-esters derived from octenyl succinic acid anhydride and characterized by the following flow viscosities:

| Starch A* (control) | 8.0 seconds | (dextrinized) |
| --- | --- | --- |
| Starch B | 16.0 seconds | (degraded) |
| Starch C | 114.8 seconds | (degraded) |

*A dextrinized and chemically modified starch derivative available from National Starch and Chemical Corporation of Bridgewater, New Jersey under the trademark CAPSUL.

The compositions of the emulsions on a dry weight basis are given in the Table, as are the tested properties of the specimen when added to coffee (2 grams whitener per 100 milliliters of coffee). The specimens made with the low viscosity starch used as a control (specimens A and D) produced oil droplet sizes far in excess of that desired for good reflectance, displayed heavy "oiling off" in coffee and exhibited very low reflectance or whitening effect. By way of contrast, the specimens made with the higher viscosity starches (specimens B and C and E and F) gave oil droplet sizes within the desired range, displayed minimal or no surface oil in coffee, spray dried easily and exhibited a desirable whitening effect or percentage reflectance. The high average oil droplet size for the controls (specimens A and D) illustrate that, at the low and very low starch to fat ratios employed, the dextrinized starch derivative does not form a good emulsion, even prior to drying, while the difficulty involved in spray drying, the high level of "oiling off" in coffee and the low percentage reflectance in coffee all reflect the inability of the dextrinized starch derivative to stabilize the emulsion through drying. The controls were totally unacceptable at the low and very low starch to fat ratios tested.

It will be appreciated that the degraded and chemically modified starch derivative of the present invention affords many of the advantages obtained through the use of sodium caseinate as a whitener stabilizer, but without the disadvantges thereof. For example, the stabilizer to fat ratio for the whitener of the present invention is comparable to that required in the protein-stabilized formulations, while being considerably less than that required in the dextrin-stabilized formulations. Also the stabilizer of the present invention, unlike the protein stabilizer, is relatively insensitive to the pH of the emulsion concentrate and will stabilize the fat through drying even if the emulsion has a relatively high pH, as opposed to the dextrin stabilizer which is effective only at a very low pH.

It will further be appreciated that the degraded and chemically modified starch derivative of the present invention affords many of the advantages obtained through the use of a dextrinized starch as a whitener stabilizer, but without the disadvantages thereof. As noted above, the stabilizer to fat ratio for the present invention is considerably less than that required in the dextrin-stabilized formulation, and the stabilizer of the present invention will stabilize the fat at a pH much higher than is possible for the dextrin stabilizer. Furthermore, the whitener of the present invention affords better taste and less fat "oiling off" than a dextrin stabilized formulation. Finally the whitener of the present invention requires neither emulsifiers nor buffering salts, although either or both may be used, if desired, while the dextrin stabilized whitener requires an emulsifier and preferably includes buffering salts.

While the whitener of the present invention has been described hereinabove in terms of a protein-free whitener, obviously in situations where some quantity of protein in the whitener can be tolerated (for example, where religious scruples are not involved), the whitener may also include quantities of a protein such as sodium caseinate.

While the present invention has been described above in terms of a coffee whitener and a method for making the same, clearly the principles of the present invention are of broader applicability. The degraded and chemically modified starch acid-ester having a flow viscosity of at least 15 seconds is an effective encapsulating agent for other types of water-insoluble substances besides the fats and oils useful in coffee whiteners. For example, the water-insoluble substance may be a flavoring, perfume or the like. Thus the present invention also encompasses dry, free-flowing particles containing a water-insoluble substance encapsulated therein, the particles consisting essentially of a solid matrix of an encapsulating agent consisting essentially of the degraded and chemically modified starch acid-ester and the matrix having the water-insoluble substance encapsulated therein in the form of minute droplets. The present invention further encompasses the degraded and chemically modified starch acid-ester being used as an encapsulating agent in a method for encapsulating a water-insoluble substance. The method comprises making an aqueous dispersion of the encapsulating agent, emulsifying the water-insoluble substance in the dispersion, and thereafter drying the resulting emulsion to form dry, free-flowing particles comprising the encapsulating agent containing the water-insoluble substance encapsulated therein.

Preferably the encapsulating agent to water-insoluble substance ratio is in the range of 0.05 to 0.3 to 1. It will be appreciated that, where the water-insoluble substance is a fat or oil, the encapsulating agent should also be of a lipophilic character. The pH of the emulsion is preferably maintained below 8.0.

To summarize, the dry, protein-free coffee whitener of the present invention requires only a relatively low starch to fat ratio and exhibits little, if any, "oiling off" and an improved taste. Furthermore, whiteners within the scope of the present invention do not require acidulation of the emulsion prior to drying, or the use of an emulsifier.

Now that the preferred embodiments of the present invention have been described in detail, various modifications and improvements thereon will become readily apparent to those skilled in the art. Accordingly the scope of the present invention is to be limited only by the appended claims, and not by the foregoing disclosure.

TABLE

| | SPECIMENS | | | | | |
|---|---|---|---|---|---|---|
| | A | B | C | D | E | F |
| INGREDIENTS | | | | | | |
| Corn syrup solids | 60.0 | 60.0 | 60.0 | 54.5 | 54.5 | 54.5 |
| Vegetable fat | 35.0 | 35.0 | 35.15.0 | 35.0 | 35.0 | |
| Starch A (control) | 5.0 | — | — | 10.5 | — | — |
| Starch B | — | 5.0 | — | — | 10.5 | — |
| Starch C | — | — | 5.0 | — | — | 10.5 |
| RESULTS | | | | | | |
| Average oil droplet size[1] | 20–40 | 1–2 | 1–2 | 10–25 | 1–2 | 1–2 |
| Ease of spray drying | difficult | easy | easy | moderate | easy | easy |
| pH of whitener in water | 4.0 | 4.0 | 4.0 | 3.8 | 3.9 | 3.9 |
| Surface oil in coffee | heavy | minimal | none | heavy | none | none |
| Reflectance, % | 1.0 | 5.5 | 5.7 | 1.7 | 5.6 | 5.7 |

[1] In liquid emulsion (50% water) prior to spray drying
[b] Difficult to spray dry; particles stick to walls of spray drier.

We claim:

1. A dry coffee whitener comprising a dried emulsion concentrate comprising an edible fat having an average particle size of about 1–3 microns in diameter, said fat being stabilized with a degraded and esterified starch derivative having a flow viscosity of at least 15 seconds and a lipophilic character in an amount sufficient to provide said dry emulsion concentrate with a starch derivative to fat ratio in the range of 0.05-0.3 to 1, the emulsion having a pH below 8.0, said starch derivative comprising a degraded starch acid-ester of a substituted dicarboxylic acid anhydride.

2. A method of preparing a stable, dry coffee whitener which comprises
(A) forming a liquid emulsion concentrate comprising (i) water and (ii) an edible fat having an average particle size of about 1-3 microns in diameter, said edible fat being stabilized with a degraded and esterified starch derivative having a flow viscosity of at least 15 seconds and a lipophilic character, said liquid emulsion concentrate containing sufficient fat to provide said concentrate, when dried, with a starch derivative to fat ratio in the range of 0.05-0.3 to 1, the emulsion having a pH below 8.0, said starch derivative comprising a degraded starch acid-ester of a substituted dicarboxylic acid anhydride, and
(B) drying said liquid emulsion concentrate.

3. The whitener/method of claims 1 or 2 wherein said dry emulsion concentrate comprises 10-70% by weight of said edible fat.

4. The whitener/method of claim 3 wherein said dry emulsion concentrate comprises 25-45% by weight of said edible fat.

5. The whitener/method of claim 3 wherein said dry emulsion concentrate further comprises up to about 85% by weight of a water-soluble carbohydrate.

6. The whitener of claim 1 wherein said dry emulsion concentrate further comprises 40-75% by weight of a water-soluble carbohydrate.

7. The whitener of claim 1 wherein said dry emulsion concentrate further comprises up to 3.0% by weight of an emulsifier.

8. The whitener/method of claims 1 or 2 wherein said whitener is protein-free.

9. The whitener of claim 1 wherein said edible fat has an average particle size of about 1 to 2 microns in diameter.

10. The whitener/method of claims 1 or 2 wherein said ratio is in the range of 0.1-0.2 to 1.

11. The whitener/method of claims 1 or 2 wherein said dry emulsion concentrate further comprises an acidulant in an amount sufficient to provide said emulsion with a pH of below 5.5.

12. The whitener/method of claims 1 or 2 wherein the dry emulsion concentrate has a pH of 4.5 or higher.

13. The whitener/method of claims 1 or 2 wherein said starch derivative has a flow viscosity of 15-150 seconds.

14. The whitener/method of claim 13 wherein said starch derivative has a flow viscosity of 80-125 seconds.

15. The whitener of claim 1 wherein said whitener further comprises a buffering salt, in an amount sufficient to provide the whitener with a pH in the range of 5.5 to 7.5 when reconstituted with water.

16. The whitener/method of claims 1 or 2 wherein said dried emulsion concentrate comprises about 40-75% by weight of a water-soluble carbohydrate, about 25-45% by weight of said edible fat, said edible fat being stabilized with said starch derivative in an amount sufficient to provide the whitener with a starch derivative to fat ratio of about 0.1-0.2 to 1, the emulsion having a pH below 5.5.

17. The whitener/method of claims 1 or 2 wherein said starch derivative comprises a starch acid-ester of a substituted succinic acid, derived from octenyl succinic acid anhydride.

18. The whitener/method of claims 1 or 2 wherein said concentrate is prepared by spray drying.

19. The whitener of claim 1 wherein said dry emulsion concentrate is emulsifier-free.

20. The whitener of claim 1 wherein said whitener is phosphate-free.

* * * * *